United States Patent [19]

Gawell et al.

[11] Patent Number: 4,645,988
[45] Date of Patent: Feb. 24, 1987

[54] TEMPERATURE COMPENSATED DRIVE CIRCUIT FOR CRT G2 GRID

[75] Inventors: George R. Gawell, Mount Prospect; Richard J. Steinmetz, Elk Grove Village; Leroy A. Sutton, Wheeling, all of Ill.

[73] Assignee: Zenith Electronics Corporation, Glenview, Ill.

[21] Appl. No.: 808,303

[22] Filed: Dec. 11, 1985

[51] Int. Cl.$^4$ .............................................. H01J 29/52
[52] U.S. Cl. ...................................... 315/401; 315/383
[58] Field of Search ................. 315/401, 383; 358/168, 358/169, 219

[56] References Cited

U.S. PATENT DOCUMENTS

| | | | |
|---|---|---|---|
| 3,562,578 | 2/1971 | Takahashi | 315/401 |
| 3,796,912 | 3/1974 | Funston | 315/401 |
| 4,283,663 | 8/1981 | Miyoshi et al. | 315/401 |
| 4,300,074 | 11/1981 | Diddens et al. | 315/401 |

Primary Examiner—Theodore M. Blum
Assistant Examiner—D. Cain

[57] ABSTRACT

A temperature compensated G2 grid drive circuit for use with a video display having a high voltage section supplying a high voltage signal to a cathode, filament and G2 grid of a CRT, wherein the high voltage section has a negative temperature coefficient, includes an input terminal for receiving the high voltage signal and a temperature compensating circuit coupled between the input terminal and the G2 grid of the CRT. The temperature compensating circuit is characterized as having a slightly positive temperature coefficient for maintaining the brightness of the video display substantially constant by driving the G2 grid for compensating for variations with temperature in the high voltage signal supplied to the cathode, filament and G2 grid.

10 Claims, 3 Drawing Figures

TEMPERATURE COMPENSATED DRIVE CIRCUIT FOR CRT G2 GRID

BACKGROUND OF THE INVENTION

This invention relates generally to cathode ray tubes (CRTs) and is particularly directed to an arrangement for stabilizing the operation of a CRT over a wide temperature range.

The miniaturization and ruggedization of CRTs have substantially increased the applications for which they are used in displaying visual information. For example, the use of CRTs in automobiles to visually present operating and status information to the vehicle operator represents one of the more recent, large scale uses for CRTs.

Some of the new environments in which CRTs can be found impose substantially more demanding operating criteria upon the CRT. For example, a CRT in an automobile may be subjected to an operating temperature range in excess of 120° F. Because of the negative temperature response of conventional high voltage circuitry which supplies the CRT, prior art approaches have exhibited reduced brightness of the video display at high operating temperatures and excessive brightness at low operating temperatures.

The present invention eliminates the aforementioned problem encountered in the prior art by providing a temperature compensated DC supply circuit for energizing the G2 grid of a CRT in ensuring substantially constant brightness in the CRT's video display over a wide temperature range.

OBJECTS OF THE INVENTION

Accordingly, it is an object of the present invention to provide for the stable operation of a CRT over a wide temperature range.

It is another object of the present invention to provide substantially constant brightness on the video display of a CRT over a wide operating temperature range.

Yet another object of the present invention is to provide an improved power supply drive circuit for the G2 grid of a CRT.

A further object of the present invention is to provide a voltage which has a slightly positive temperature coefficient to the G2 grid of a CRT over a wide operating temperature range for stabilizing the brightness of the CRT's display.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

DETAILED DESCRIPTION OF A PREFERRED EMBODIMENT

Figure 1:
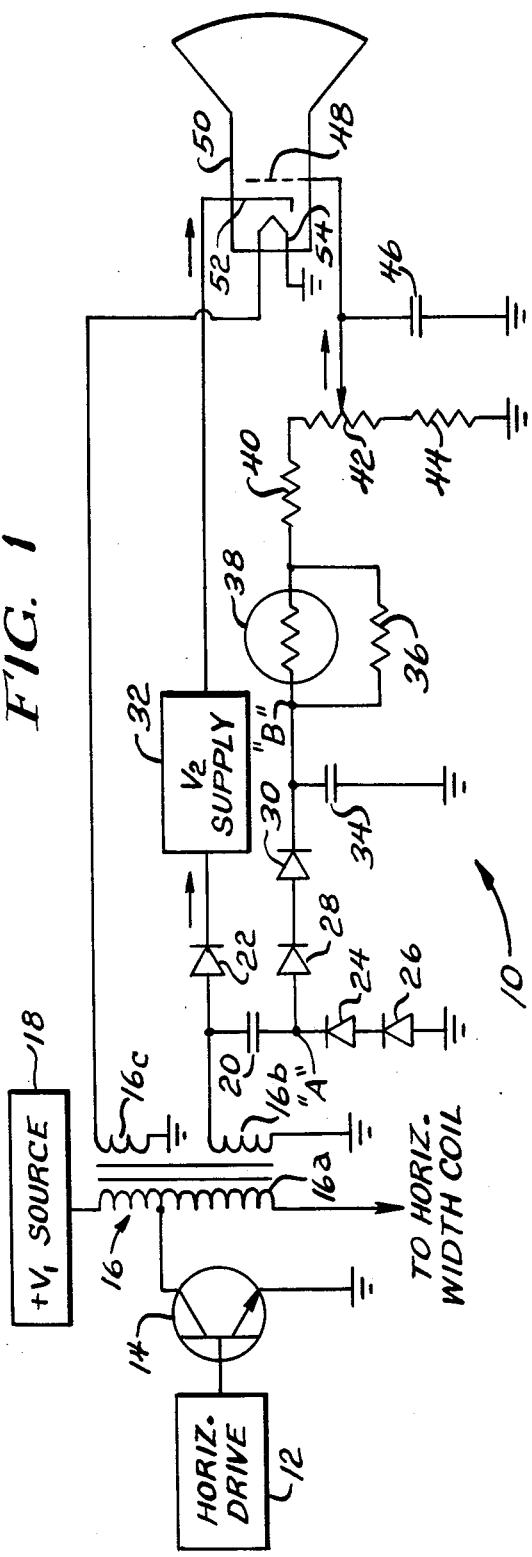
FIG. 1 is a simplified combined schematic and block diagram of a temperature compensated DC supply circuit for the G2 grid of a CRT in accordance with the present invention.

Referring to FIG. 1, there is shown in simplified combined schematic and block diagram form a temperature compensated G2 drive circuit 10 in accordance with the present invention for use with a cathode ray tube 50.

Figure 2:
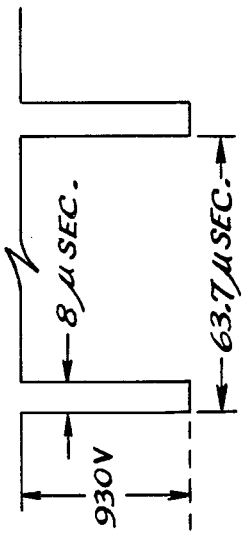
FIG. 2 is a pulse diagram of an input voltage provided to the temperature compensated DC supply circuit of FIG. 1.

The pulsed output of a horizontal driver circuit 12 is provided to the base of an NPN transistor 14. The emitter of NPN transistor 14 is coupled to neutral ground potential, while its collector is coupled to a primary winding 16a of a high voltage sweep transformer 16. One end of the primary winding 16a of the high voltage sweep transformer 16 is coupled to a $+V_1$ DC source 18, while the other end of the primary winding is coupled to a horizontal width control coil (not shown). The periodic pulses provided to the primary winding 16a from NPN transistor 14 cause a pulsed high voltage to be applied across the primary winding and a corresponding high voltage to be induced in a secondary winding 16b of the high voltage sweep transformer 16. With one end of the secondary winding 16b coupled to neutral ground potential, a pulsed high voltage (approximately 930 volts) is derived from the other end of the secondary winding 16b as shown in FIG. 2. This pulsed output is provided to the anode of a diode 22 for driving a $V_2$ power supply 32 which energizes cathode 52 of the CRT 50. The pulsed high voltage output from the secondary winding 16c of the high voltage sweep transformer 16 is coupled to the filament 54 of CRT 50 and the drive circuit 10 supplying the G2 grid 48 of CRT 50 provided across capacitor 20. The approximately 930 volt pulse provided to drive circuit 10 is developed across a capacitor 20 which is clamped to ground by means of serially coupled grounded diodes 24 and 26. With point A maintained essentially at neutral ground potential, an approximately 930 volt pulse is provided to the anode of diode 28. The combination of serially coupled diodes 28 and 30 and grounded capacitor 34 filters and rectifies the 930 volt pulse so as to provide DC voltage to point B. It will thus be seen that the high voltage pulses supply various components of CRT 50 including its cathode 52, its filament 54 and its G2 grid 48. Thus, since the circuitry producing the high voltage pulses is characterized by a negative temperature coefficient (i.e., the high voltage pulses tend to decrease with increasing temperature), CRT brightness will decrease with increased temperature because of the reduced voltage provided to the cathode, filament and G2 grid of the CRT. The present invention compensates for such brightness decreases (or increases if temperature decreases) by providing the novel G2 grid drive circuit which provides an output voltage having a slightly positive temperature coefficient to compensate not only the temperature-variable voltage provided to the G2 grid, but also the voltages supplied to the CRT's cathode and filament.

Figure 3:
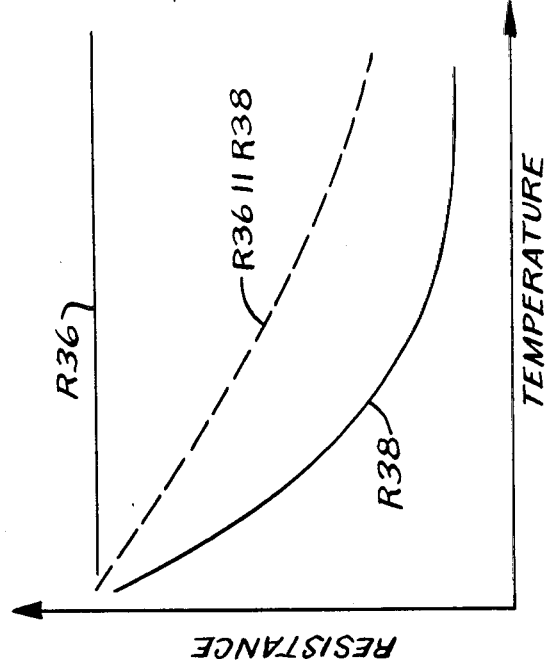
FIG. 3 graphically illustrates the temperature operating characteristic of an output portion of the DC supply circuit of FIG. 1.

With further reference to FIG. 1, G2 grid drive circuit 10 includes the parallel arrangement of a resistor 36 and a thermistor 38 which are connected to point B. In a preferred embodiment, resistor 36 is a metal film resistor having a very low, substantially flat temperature coefficient of resistance typically measured in 100 parts per million. On the other hand, thermistor 38 is characterized as having a large negative temperature coefficient of resistance wherein its resistance exhibits a large decrease with increasing temperature. The variation in the resistive characteristic or temperature coefficient of both components with temperature is shown in FIG. 3 wherein the resistance of metal film resistor 36 is illustrated as a generally straight horizontal line and the resistive characteristic of thermistor 38 is illustrated as a curve having a large negative slope. By incorporating the metal film resistor 36 and the thermistor 38 in circuit in a parallel arrangement, an intermediate resistive characteristic having a negative temperature coefficient shown in dotted line form in FIG. 3 is realized by the parallel arrangement. The arrangement of parallel coupled resistor 36 and thermistor 38 is coupled in series with a group of resistors 40, 42 and 44, resistors 40 and 44 also being metal film resistors having substantially constant temperature coefficients and resistor 42 being a ceramic potentiometer having a negative temperature coefficient. It will be recalled that an increase in temperature results in a decreased high voltage at point B. However, since the voltage across the parallel combination of resistor 36 and thermistor 38 will also decrease, the voltage supplied to G2 grid 48 through filter capacitor 46 will increase slightly. This slightly positive temperature coefficient of the output portion of the temperature compensated G2 drive circuit 10 compensates for the change in voltage at point B as well as for the reduced voltage supplied to the cathode 52 and filament 54 to provide a substantially constant overall temperature coefficient for the CRT. The values of resistor 36 and thermistor 38 in a preferred embodiment are shown in Table I which also indicates the variation with temperature of the voltage applied to the CRT's G2 grid 48.

TABLE I

| °C. | R38 (meg.) | R38 ‖ R36 (meg.) | G2 Voltage |
|---|---|---|---|
| −30 | 10.0 | 0.99 | 610 |
| 25 | 0.5 | 0.34 | 620 |
| 105 | 0.02 | 0.02 | 630 |

There has thus been shown a temperature compensated DC supply circuit for providing a voltage having a slightly positive temperature coefficient to the G2 grid of a CRT for maintaining a substantially fixed level of brightness on the CRT's video display over a wide operating temperature range.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use with a video display having a high voltage section supplying a high voltage signal to a cathode, filament and G2 grid of a CRT, wherein said high voltage section has a negative temperature coefficient, a temperature compensated G2 grid drive circuit comprising:

an input terminal for receiving said high voltage signal; and temperature compensating means coupled between said input terminal and the G2 grid of said CRT, said temperature compensating means having a slightly positive temperature coefficient for maintaining the brightness of said video display substantially constant by driving the G2 grid for compensating for variations with temperature in said high voltage signal supplied to said cathode, filament and G2 grid.

2. The temperature compensated G2 grid drive circuit of claim 1 wherein said temperature compensating means includes a thermistor.

3. The temperature compensated G2 grid drive circuit of claim 2 wherein said temperature compensating means further includes a first resistor coupled in parallel with said thermistor and having a negative temperature coefficient.

4. The temperature compensated G2 grid drive circuit of claim 3 wherein said first resistor is a metal film resistor.

5. The temperature compensated G2 grid drive circuit of claim 3 wherein said temperature compensating means further includes a plurality of serially coupled second resistors coupled in series with the parallel arrangement of said thermistor and said first resistor and further coupled to the G2 grid.

6. The temperature compensated G2 grid drive circuit of claim 5 wherein each of said second resistors is a metal film resistor.

7. The temperature compensated G2 grid drive circuit of claim 5 wherein said temperature compensating means further includes a selectively variable resistance coupled in series with said plurality of serially coupled second resistors and coupled directly to the G2 grid of the CRT for permitting the high voltage signal and the brightness of the video display to be established as desired.

8. The temperature compensated G2 grid drive circuit of claim 7 wherein said selectively variable resistance comprises a ceramic potentiometer.

9. For use with a video display having a high voltage section supplying a high voltage signal to a cathode, filament and G2 grid of a CRT, wherein said high voltage section has a negative temperature coefficient, a temperature compensated G2 grid drive circuit comprising:

an input terminal for receiving said high voltage signal and temperature compensating means coupled between said input terminal and the G2 grid of said CRT, said temperature compensating means including a thermistor coupled in parallel with a metal film resistor, said temperature compensating means having a slightly positive temperature coefficient for maintaining the brightness of said video display substantially constant by driving the G2 grid for compensating for variations with temperature in said high voltage signal supplied to said cathode, filament and G2 grid.

10. For use with a video display having a high voltage section supplying a high voltage signal to a cathode, filament and G2 grid of a CRT, wherein said high voltage section has a negative temperature coefficient, a temperature compensated G2 grid drive circuit comprising:

an input terminal for receiving said high voltage signal; and temperature compensating means coupled between said input terminal and the G2 grid of the CRT, said temperature compensating means including a thermistor coupled in parallel with a first resistor and a plurality of serially coupled second resistors coupled to said thermistor and said first resistor, wherein said thermistor and said first resistor are coupled to said input terminal and said plurality of serially coupled second resistors are coupled to the G2 grid, and wherein said temperature compensating means has a slightly positive temperature coefficient for maintaining the brightness of said video display substantially constant by driving the G2 grid for compensating for variations with temperature in said high voltage signal supplied to said cathode, filament and G2 grid.

* * * * *